United States Patent
Krishnan et al.

(10) Patent No.: US 11,378,668 B2
(45) Date of Patent: Jul. 5, 2022

(54) RADAR CALIBRATION

(71) Applicant: Ford Global Technologies, LLC, Dearborn, MI (US)

(72) Inventors: Krishanth Krishnan, Windsor (CA); Sangjin Lee, Pittsburgh, PA (US); Ankit Girish Vora, Dearborn, MI (US); Siddharth Agarwal, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 215 days.

(21) Appl. No.: 16/807,608

(22) Filed: Mar. 3, 2020

(65) Prior Publication Data

US 2021/0278511 A1 Sep. 9, 2021

(51) Int. Cl.
| | | |
|---|---|---|
| *G01S 7/497* | (2006.01) | |
| *G01S 7/40* | (2006.01) | |
| *G01S 13/34* | (2006.01) | |
| *G01S 13/86* | (2006.01) | |

(Continued)

(52) U.S. Cl.
CPC ............ *G01S 7/497* (2013.01); *G01S 7/4004* (2013.01); *G01S 13/34* (2013.01); *G01S 13/865* (2013.01); *G01S 13/931* (2013.01); *G01S 2013/932* (2020.01); *G01S 2013/93271* (2020.01)

(58) Field of Classification Search
None
See application file for complete search history.

(56) References Cited

U.S. PATENT DOCUMENTS

| 9,719,801 B1 * | 8/2017 | Ferguson | G01S 13/931 |
| 10,656,246 B2 * | 5/2020 | Marsch | G01S 7/4026 |

(Continued)

FOREIGN PATENT DOCUMENTS

| CN | 109613495 A | | 4/2019 | |
| EP | 3104189 A1 | | 12/2016 | |
| GB | 2213339 A1 * | | 8/1989 | G01S 7/4026 |

OTHER PUBLICATIONS

D. Menzel, "Fundamental Formulas of Physics"; vol. 1, chapter 2, section 1.1, pp. 107-108; Dover Publications, Inc., New York, Ny, USA; copyright in the year 1960. (Year: 1960).*

*Primary Examiner* — Bernarr E Gregory
(74) *Attorney, Agent, or Firm* — Frank A. MacKenzie; Bejin Bieneman PLC

(57) ABSTRACT

A calibration system for a radar sensor and a method of using the system are disclosed. The method may comprise (a) receiving, from a first sensor in a vehicle, a plurality of global navigation satellite system (GNSS) parameters, wherein the plurality of GNSS parameters define a unique terrestrial position of the first sensor; (b) receiving, from a radar sensor in the vehicle, a plurality of radar parameters, wherein the plurality of radar parameters define a position of a calibration target relative to the radar sensor; (c) repeating the receiving of (a) and (b) at additional unique terrestrial positions of the first sensor; (d) using the plurality of GNSS parameters received in (a) and (c) and the plurality of radar parameters received in (b) and (c), determining corresponding positions of the calibration target; and (e) using the corresponding positions of the calibration target, determining radar calibration parameters.

19 Claims, 3 Drawing Sheets

(51) Int. Cl.
*G01S 13/931* (2020.01)
*G01S 13/00* (2006.01)

(56) References Cited

U.S. PATENT DOCUMENTS

| | | | |
|---|---|---|---|
| 2012/0271540 A1* | 10/2012 | Miksa | G01S 13/931 |
| | | | 701/409 |
| 2017/0038477 A1* | 2/2017 | Schmid | G01S 19/48 |
| 2018/0113195 A1 | 4/2018 | Bialer et al. | |
| 2018/0149739 A1* | 5/2018 | Becker | G01S 13/931 |

* cited by examiner

700

RADAR CALIBRATION

BACKGROUND

Calibrating radar equipment can require aligning the radar equipment and another sensor at a common target. This procedure can be time-consuming and unnecessarily burdensome.

DETAILED DESCRIPTION

Figure 1:
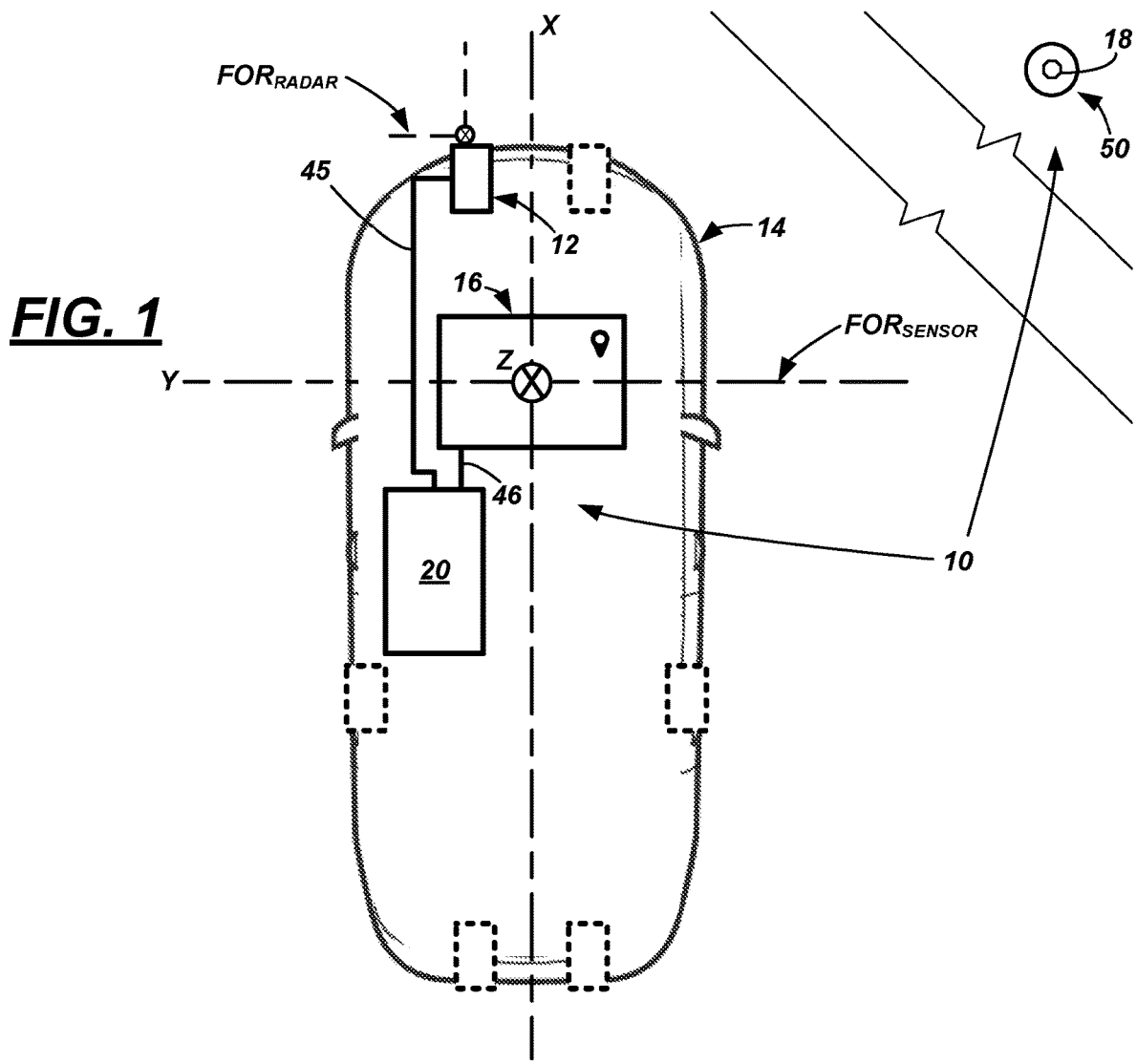
FIG. 1 is a schematic diagram of a calibration system for a radar sensor in a vehicle, the system comprising a first sensor, a computer, and a calibration target.

A calibration system for a radar sensor and a method of using the system are disclosed. The method may comprise (a) receiving, from a first sensor in a vehicle, a plurality of global navigation satellite system (GNSS) parameters, wherein the plurality of GNSS parameters define a unique terrestrial position of the first sensor; (b) receiving, from a radar sensor in the vehicle, a plurality of radar parameters, wherein the plurality of radar parameters define a position of a calibration target relative to the radar sensor; (c) repeating the receiving of (a) and (b) at additional unique terrestrial positions of the first sensor; (d) using the plurality of GNSS parameters received in (a) and (c) and the plurality of radar parameters received in (b) and (c), determining corresponding positions of the calibration target; and (e) using the corresponding positions of the calibration target, determining radar calibration parameters.

According to the method example set forth above and/or according to any of the other examples set forth above, (a), (b), and (c) are repeated to receive a threshold quantity of unique terrestrial positions.

According to the method example set forth above and/or according to any of the other examples set forth above, (e) further comprises: determining the radar calibration parameters using a first transformation matrix relative to a frame of reference of the first sensor and using a second transformation matrix relative to a frame of reference of the second sensor.

According to the method example set forth above and/or according to any of the other examples set forth above, at least one of the first or second transformation matrices is a rotation matrix.

According to the method example set forth above and/or according to any of the other examples set forth above, (e) further comprises: determining a plurality of Euclidean differences using the corresponding positions of the calibration target.

According to the method example set forth above and/or according to any of the other examples set forth above, (e) further comprises: determining a summation of the plurality of Euclidean differences; and determining the radar calibration parameters using an optimization function that determines a set of radar calibration parameters that minimize the summation.

According to the method example set forth above and/or according to any of the other examples set forth above, the set of radar calibration parameters comprise either: an x-parameter, a y-parameter, and a yaw-parameter.

According to the method example set forth above and/or according to any of the other examples set forth above, further comprising: determining an upper bound or a lower bound of each of the radar calibration parameters.

According to the method example set forth above and/or according to any of the other examples set forth above, further comprising: programming a computer or the radar sensor with the radar calibration parameters.

According to the method example set forth above and/or according to any of the other examples set forth above, the calibration target is fixed during (b) and (c).

According to the method example set forth above and/or according to any of the other examples set forth above, the first sensor is within a threshold distance of the calibration target during (b) and (c).

According to the method example set forth above and/or according to any of the other examples set forth above, the radar sensor is a two-dimensional (2D) radar sensor or a three-dimensional (3D) radar sensor, wherein the first sensor is one of a Global Positioning System (GPS) device or a Global Navigation Satellite System (GLONASS) device.

According to the method example set forth above and/or according to any of the other examples set forth above, the calibration target is a corner reflector.

According to at least one additional illustrative example, a calibration system for a radar sensor in a vehicle is described that comprises: a first sensor in the vehicle; a calibration target; and a computer, comprising one or more processors and memory storing instructions executable by the one or more processors, the instructions comprising to: (a) receive, from a first sensor in the vehicle, a plurality of global navigation satellite system (GNSS) parameters, wherein the plurality of GNSS parameters define a unique terrestrial position of the first sensor; (b) receive, from the radar sensor in the vehicle, a plurality of radar parameters, wherein the plurality of radar parameters define a position of a calibration target relative to the radar sensor; (c) repeat the receiving of (a) and (b) at additional unique terrestrial positions of the first sensor; (d) using the plurality of GNSS parameters received in (a) and (c) and the plurality of radar parameters received in (b) and (c), determine corresponding positions of the calibration target; and; (e) using the corresponding positions of the calibration target, determine radar calibration parameters.

According to the system example set forth above and/or according to any of the other examples set forth above, wherein (e) further comprises to: determine the radar calibration parameters using a first transformation matrix relative to a frame of reference of the first sensor and using a second transformation matrix relative to a frame of reference of the second sensor.

According to the system example set forth above and/or according to any of the other examples set forth above, wherein (e) further comprises to: determine a plurality of Euclidean differences using the corresponding positions of the calibration target.

According to the system example set forth above and/or according to any of the other examples set forth above, wherein (e) further comprises to: determine a summation of the plurality of Euclidean differences; and determine the radar calibration parameters using an optimization function that determines a set of radar calibration parameters that minimize the summation.

According to the system example set forth above, the set of radar calibration parameters comprise either: an x-parameter, a y-parameter, and a yaw-parameter.

According to the system example set forth above, the instructions further comprise to: program a computer or the radar sensor with the radar calibration parameters.

According to the system example set forth above, the calibration target is fixed during (b) and (c).

According to the at least one example set forth above, a computing device comprising at least one processor and memory is disclosed that is programmed to execute any combination of the examples of the method(s) set forth above.

According to the at least one example, a computer program product is disclosed that includes a computer readable medium that stores instructions which are executable by a computer processor, wherein the instructions of the computer program product include any combination of the examples of the method(s) set forth above and/or any combination of the instructions executable by the one or more processors, as set forth above and herein.

Turning now to the figures, wherein like reference numerals indicate like or similar features and/or functions, a calibration system 10 is disclosed for a radar sensor 12 in a vehicle 14. The system 10 may comprise a first sensor 16 which determines a terrestrial location of the vehicle 14 (and more particularly of the first sensor 16 itself), a calibration target 18 (external of the vehicle 14), and a computer 20 which executes calibration instructions. In general, the calibration system 10 may be used to determine calibration parameters for the radar sensor 12—e.g., during factory assembly or installation (or any other time in which the radar sensor 12 requires re-calibration). As will be explained more in the example process set forth below, by acquiring location data from the first sensor 16 and by taking multiple measurements using the radar sensor 12 and the calibration target 18, radar calibration may be determined without correlating imaging data (e.g., from a camera or lidar) to radar data (i.e., wherein the imaging data and radar data observe a common physical object). Further radar calibration may be determined without complex vehicle test stations and without time-consuming measurements in a calibration laboratory.

Vehicle 14 may be a passenger vehicle (as shown); however, this is merely one example. Vehicle 14 instead could be a truck, a sports utility vehicle (SUV), a recreational vehicle, a bus, an aircraft, or any other suitable vehicle that comprises one or more radar sensors 12, first sensor 16, and computer 20. Vehicle 14 may be configured to operate in any suitable partially autonomous or fully autonomous mode (e.g., including navigation without human interaction). During such autonomous operation, the first sensor 16 and radar sensor(s) 12 may be used to sense objects in the vehicle's environment and provide data to an autonomous driving computer (not shown).

As data from radar sensor 12 may be used to successfully (and at least partially autonomously) navigate vehicle 14, it is desirable to maximize the accuracy of radar sensor 12. Accuracy can be improved using a calibration. Radar sensor 12 is an active sensing, electronic device that detects objects as sparse detections (few detection per object) with less accuracy compared to a lidar sensor which detects objects with thousands of detections per object with high accuracy. FIG. 1 illustrates multiple radar sensors on vehicle 14 (some being shown in phantom at example locations on vehicle 14); any suitable quantity of radar sensors 12 may be used. Further, when multiple radar sensors 12 are located on vehicle 14, aspects of the calibration process described herein may be executed similarly for each of the second, third, etc. radar sensor.

Radar sensor 12 may comprise any suitable hardware device that emits a radio signal (e.g., in the extremely high frequency (EHF) band), receives a reflection from a physical object, and based on a time difference, determines a range and/or other parameters. According to a non-limiting example, radar sensor 12 may be a two-dimensional (2D) radar sensor; thus, using this technology, radar sensor may acquire a range parameter, an azimuth parameter, and optionally a range-rate parameter. Thus, as will be explained in greater detail below, using the range and azimuth parameters, computer 20 or the radar sensor 12 may determine a first coordinate parameter (x), a second coordinate parameter (y), and a yaw parameter ($\psi$) with respect to the calibration target 18. According to another non-limiting example, radar sensor 12 may be a three-dimensional (3D) radar sensor; thus, using this technology, radar sensor 12 may acquire a range parameter, an azimuth parameter, an elevation parameter, and optionally a range-rate parameter. Thus, as will be explained in greater detail below, using the range, azimuth, and elevation parameters, computer 20 or the radar sensor 12 may determine a first coordinate parameter (x), a second coordinate parameter (y), a third coordinate parameter (z), a roll parameter ($\phi$), a pitch parameter ($\theta$), and a yaw parameter ($\psi$) with respect to the calibration target 18. Thus, a position of the targeted physical object may be determined with respect to the radar sensor 12 (e.g., according to a radar-sensor frame of reference $FOR_{RADAR}$).

First sensor 16 may be any electronic hardware equipment which provides terrestrial location data. According to a non-limiting example, first sensor 16 comprises Global Navigation Satellite System (GNSS) equipment that determines location data (e.g., a latitude (LAT) parameter and a longitude (LONG) parameter) using information (e.g., from a constellation of satellites 28—e.g., shown in FIG. 5). For instance, two typical and non-limiting examples of GNSS equipment include an Inertial Measurement Unit (IMU) coupled with one of a Global Positioning System (GPS) device or a Global Navigation Satellite System (GLONASS) device. In at least one example, the GPS device is a Differential Global Positioning System (DGPS) device; however, this is not required. According to at least some examples, GNSS equipment may have an accuracy less than 5 centimeters (cm); however, this too is merely an example.

Figure 2:
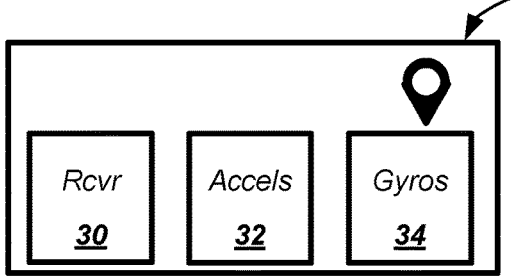
FIG. 2 is a schematic diagram of an example of the first sensor.

FIG. 2 illustrates first sensor 16 (e.g., in this example, a GPS device) that comprises a satellite receiver 30 (e.g., which includes known components such as antenna(s), a wireless chipset, amplifier(s), filters, and the like) and IMU components—e.g., one or more accelerometers 32 (e.g., such as a tri-axis accelerometer measuring acceleration in x-, y-, z-axes of the first sensor 16) and one or more rotational sensors 34 (e.g., such as a tri-axis gyroscope measuring rotation about the x-, y-, z-axes of first sensor 16). This is merely an example however. In other examples, the accelerometers 32 and/or rotational sensors 34 may be located external to the first sensor 16 or elsewhere vehicle 14 (in these instances, accelerations and rotations may be extrapolated and/or calculated for the first sensor 16 based on the relative spacing and orientation of the first sensor 16 with respect to the accelerometer(s) 32 and/or rotational sensor(s) 34 in the vehicle 14).

According to the example, shown in FIG. 1, first sensor 16 may be located at an origin of a longitudinal axis X, a transverse axis Y, and a vertical axis Z (here, the longitudinal axis X coincides with a longitudinal axis of vehicle 14; however, this is merely an example and is not required). Collectively, these axes may define a first-sensor frame of reference $FOR_{SENSOR}$ (e.g., where the first sensor 16 is relative to an earthly position (a.k.a., a world or global frame of reference—e.g., from the perspective of satellites 28)).

Other examples of first sensor 16 also exist. For example, first sensor 16 may include a lidar or other imaging system that determines scans the vehicle's environment and determines LAT, LONG parameters of the first sensor 16 using nearby objects and features. E.g., the vehicle 14 may be in an urban environment and the lidar or other imaging system may determine localization data relevant to autonomous navigation (using street signs, landmarks, lane markers, roadside curbs, etc.), wherein using the localization data, a precise location of the first sensor 16 in three-dimensional space may be determined.

Figure 3:
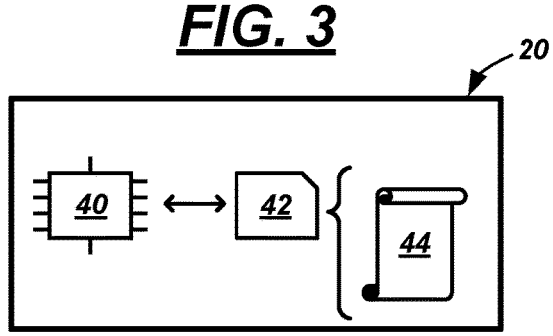
FIG. 3 is a schematic diagram of an example of the computer.

Computer 20 (FIGS. 1, 3) may comprise one or more processors 40 (only one is shown in the diagram for purposes of illustration), memory 42, and a plurality of instructions 44 (by way of example only, software code) which is stored on memory 42 and which is executable by processor(s) 40. Processor(s) 40 may be programmed to process and/or execute digital instructions to carry out at least some of the tasks described herein. Non-limiting examples of processor(s) 40 include one or more of a microprocessor, a microcontroller or controller, an application specific integrated circuit (ASIC), a field-programmable gate array (FPGA), one or more electrical circuits comprising discrete digital and/or analog electronic components arranged to perform predetermined tasks or instructions, etc.—just to name a few. In at least one example, processor(s) 40 read from memory 42 and execute multiple sets of instructions (e.g., including instructions 44) which may be embodied as a computer program product stored on a non-transitory computer-readable storage medium (e.g., such as memory 42). Non-limiting examples of instructions 44 will be described below in the processes illustrated using flow diagrams and described elsewhere herein, wherein these and other instructions may be executed in any suitable sequence unless otherwise stated. The instructions and the example processes described below are merely embodiments and are not intended to be limiting.

Memory 42 may include any non-transitory computer usable or readable medium, which may include one or more storage devices or storage articles. Exemplary non-transitory computer usable storage devices include conventional hard disk, solid-state memory, random access memory (RAM), read-only memory (ROM), erasable programmable read-only memory (EPROM), electrically erasable programmable read-only memory (EEPROM), as well as any other volatile or non-volatile media. Non-volatile media include, for example, optical or magnetic disks and other persistent memory, and volatile media, for example, also may include dynamic random-access memory (DRAM). These storage devices are non-limiting examples; e.g., other forms of computer-readable media exist and include magnetic media, compact disc ROM (CD-ROMs), digital video disc (DVDs), other optical media, any suitable memory chip or cartridge, or any other medium from which a computer can read. As discussed above, memory 42 may store data (e.g., such as parameters F) and/or may store one or more sets of instructions (e.g., such as instructions 44) which may be embodied as software, firmware, or other programming instructions executable by the processor(s) 40—including but not limited to the instruction examples set forth herein. In operation, processor(s) 40 may read data from and/or write data to memory 42.

As will be described below in the calibration process, for each of a plurality of positions of vehicle 14 relative to calibration target 18, computer 20 may determine a position of target 18 using radar sensor 12 and receive, from the first sensor 16, its position. Then, for each of the plurality of positions of vehicle 14, the computer may calculate a position of the radar sensor 12 with respect to the first sensor 16. In an ideal system, each of these calculated positions would be identical; however, as no system is ideal, the computer 20 may use the calculated positions and a cost function or other similar technique to determine the calibration parameters of the radar sensor 12. This process will be discussed in more detail below.

FIG. 1 illustrates that computer 20 may be communicatively coupled to radar sensor 12 and first sensor 16 via links 45, 46, respectively. Non-limiting examples of these links 45, 46 include wired and/or wireless links (e.g., using local area network(s), local interconnect network(s), etc.). Non-limiting wired link examples include discrete connection(s) and/or data bus(es). And data bus(es) (such as Ethernet, FireWire, etc.) may utilize known protocols (e.g., CAN) and/or proprietary protocols. Non-limiting wireless link implementations may utilize any suitable short-range wireless technology.

Figure 4:
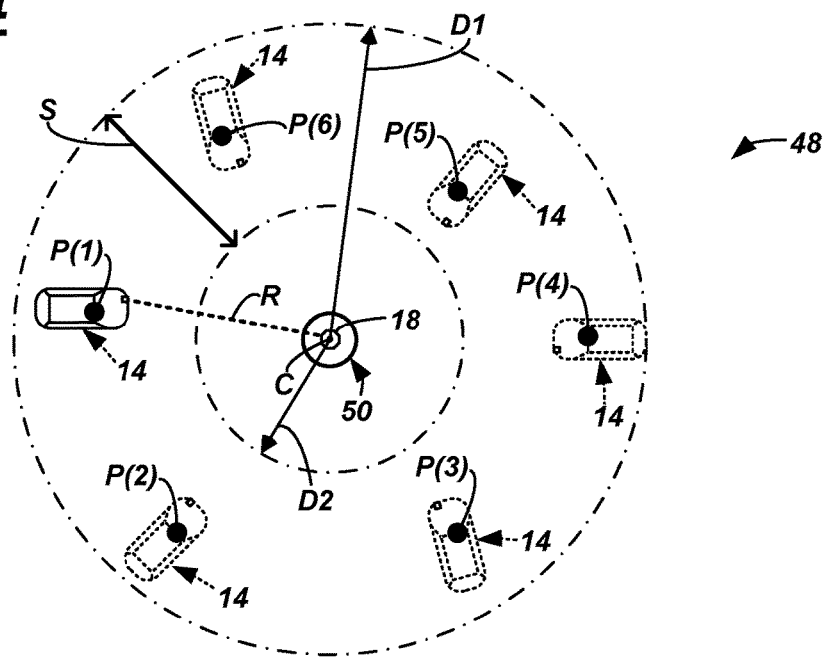
FIG. 4 is a schematic diagram (in plan view) illustrating an example of a calibration arrangement comprising the calibration target and the vehicle shown in various positions around the calibration target.
Figure 5:
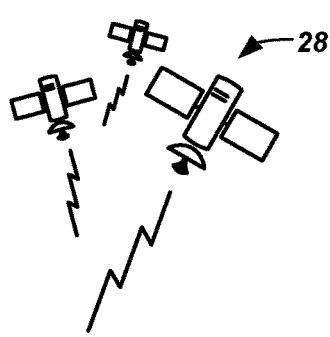
FIG. 5 is an elevation view of a portion of the schematic diagram shown in FIG. 4.
Figure 6:
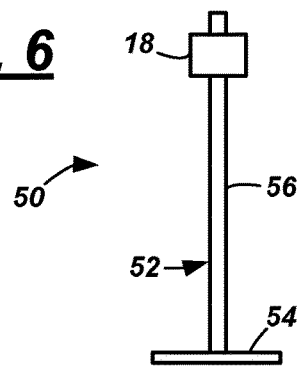
FIG. 6 illustrates a schematic diagram of an example assembly that comprises the calibration target.
Figure 6:
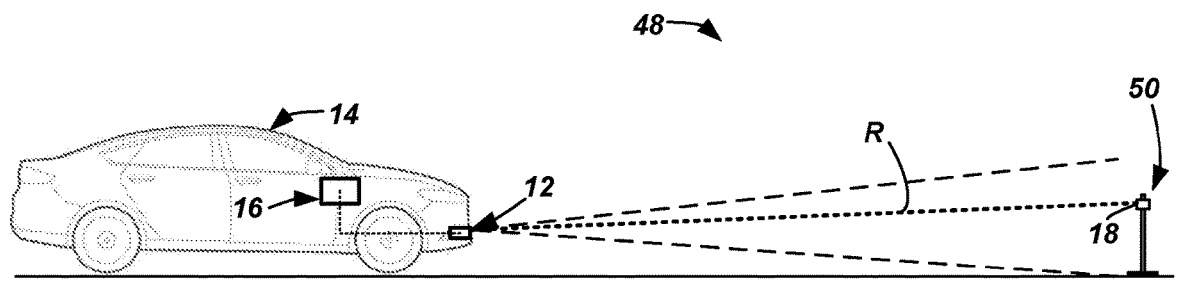

FIGS. 4-5 illustrate vehicle 14 located in an example calibration arrangement 48, wherein the arrangement 48 includes calibration target 18 (shown as part of an assembly 50). According to one non-limiting example, calibration target 18 comprises one or more corner reflectors (e.g., trihedral corner reflector(s)); however, other examples also can be used. As best shown in FIG. 6, assembly 50 may comprise a stand 52 that supports and carries calibration target 18—e.g., the stand 52 may comprise a base 54 and a post 56 extending upwardly from the base 54, wherein the target 18 is coupled to the post 56. In at least one example, multiple corner reflectors arranged circumferentially around post 56 (e.g., at a common height). This is merely an example; the target 18 may comprise any suitable element that returns a radio signal to the radar sensor 12. Further, the target 18 instead could be suspended, supported in other ways, etc.

Returning to FIGS. 4-5, according to the example calibration arrangement 48, the calibration target 18 is fixed during the calibration process at a center location C, and the vehicle 14 is iteratively and randomly re-located circumferentially around center location C. As shown in FIG. 4, positions P(a) define the locations of the first sensor 16 within vehicle 14; in the illustration, a: 1→6 (thus, FIG. 4 illustrates (P(1), P(2), P(3), P(4), P(5), and P(6)); however, this quantity is not required. Further, according to at least one non-limiting example, a minimum of four positions (e.g., $a_{THR}=4$) are used during calibration, and each of the four positions are angularly spaced by at least 40-90 degrees from one another. By angularly spacing the positions about the calibration target 18, a bias in the calibration parameters may be minimized. As will be apparent from the description that follows, calibration accuracy may increase with larger quantities of positions P(a).

Positions P(a) may be located within a maximum threshold distance D1 of center location C. According to one example, the maximum threshold distance D1 is 30 meters. This threshold is an example, and other values may be used instead in other implementations. According to one example, a minimum threshold distance D2 also could be used so that positions P(a) are located within a span S (defined by the difference of threshold distances D1 and D2). E.g., according to one implementation, minimum threshold distance D2 could be 5 meters (again, this is merely an example).

FIGS. 4-5 also illustrate a range R between the radar sensor 12 and the calibration target 18. As described above, this range R may be a measured, scalar value (magnitude) and may be used to determine the various coordinate and rotation parameters in the process which follows.

Figure 7:
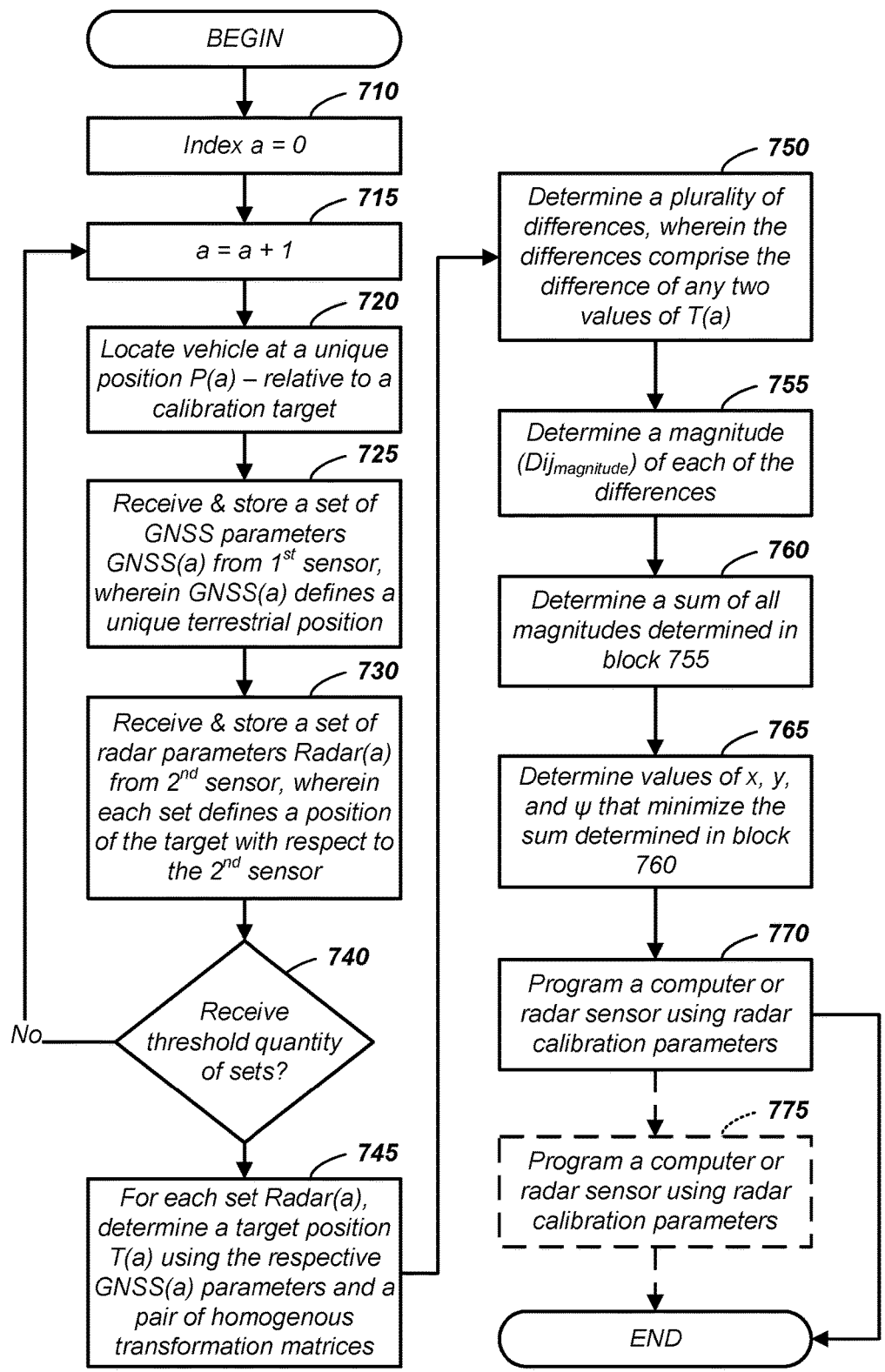
FIG. 7 is a flow diagram illustrating a computer-implemented process of calibrating the radar sensor using the calibration target and location data received from the first sensor.

Turning now to FIG. 7, a flow diagram is shown illustrating an example process 700 of calibrating the radar sensor 12 using the calibration target 18 and location data from the first sensor 16. The process 700 may comprise software instructions executable by computer 20 (e.g., executable by the one or more processors 40 stored in memory 42). Non-limiting examples of software instructions are illustrated as instructional blocks in the diagram. It will be appreciated that while not necessarily explained explicitly in process 700, other software instructions may be carried out as well. Further, the order of the instructions is merely exemplary unless other indicated.

For purposes of clarity and not intending to be limiting, in the description of process 700, first sensor 16 will be described as a GPS device which is fixedly coupled to vehicle 14. Further, positions P(a) will be described with respect to the GPS device (or a projection of position P(a) on the Earth's surface). Also, in the description of process 700, radar sensor 12 may be referred to as a second sensor, and radar sensor 12 also may be fixedly coupled to vehicle 14.

Further, while a 2D radar sensor is described in process 700, it should be appreciated that the process similarly may be extended to determining calibration parameters for a 3D radar sensor (e.g., which may include a range calibration parameter, an azimuth calibration parameter, and an elevation calibration parameter—e.g., based one or more returns at the 3D radar sensor and determining and/or using a first coordinate parameter (x), a second coordinate parameter (y), a third coordinate parameter (z), a roll parameter ($\phi$), a pitch parameter ($\theta$), and a yaw parameter ($\psi$).

Process 700 may begin at block 710. In block 710, computer 20 may initialize a counter variable 'a' which may be stored in memory 42. Variable 'a' may be a value used to index the positions P(a) and the corresponding datasets that will be determined later in the process.

Block 715 may follow. In block 715, computer 20 may increment variable 'a,' increasing its value by '1' (e.g., a=a+1). Hence, during a first loop of blocks 715-740, a=1, whereas in later loops, this value will change.

In block 720 which may follow, first sensor 16 of vehicle 14 may be located at a unique position P(a)—relative to calibration target 18 and within maximum threshold distance D1 (e.g., as shown in FIG. 4). E.g., the vehicle 14 may be driven and parked—and the location of first sensor 16 defines its position P(a). As described above, first sensor 16 also may be at least a minimum threshold distance D2 from target 18 in some examples. Thus, during the first loop of blocks 715-740, this may be defined as P(1), whereas in later loops, these positions will change such that each position P(a) is unique.

In block 725, computer 20 may receive and store from first sensor 16 a set of GNSS parameters GNSS(a) that define a unique terrestrial position of first sensor 16. According to one example, GNSS(a) may be defined using a LAT parameter and a LONG parameter, according to first-sensor frame of reference (FOR$_{SENSOR}$); however, this is not required.

In block 730 which may follow, radar sensor 12 emits a signal and receives at least one return from calibration target 18, and based on the at least one return, computer 20 receives and/or determines a range parameter (range), an azimuth parameter ($\psi$), and optionally a range-rate parameter (rate)—e.g., according to the radar-sensor frame of reference (FOR$_{RADAR}$). Thus, in block 830, computer 20 may receive and store in memory 42 from second sensor 12 a set of radar parameters Radar(a) that define a position of the calibration target 18 with respect to the second sensor 12. Equation (1) illustrates an example of Radar(a) for 2D radar implementations (note: the third term is zero for 2D calculations).

$$\text{Radar}(a) = [xy0] = [\text{range}*\cos(\psi) \text{ range}*\sin(\psi) 0] \quad \text{Equation (1)}$$

In block 740 which follows, computer 20 may determine whether a threshold quantity of datasets have been received. If, e.g., the threshold quantity is six (e.g., $a_{THR}=6$), then process 700 loops back to block 715.

In this example, blocks 715-740 are repeated until the threshold quantity of datasets has been collected. For each iteration of this loop, vehicle 14 is relocated to a unique position P(a). Thus, each set of GNSS parameters GNSS(a) should be unique as the vehicle's GPS device has moved. Further, each set of radar parameters Radar(a) is likely to be unique. Further, each set of GNSS parameters GNSS(a) will correspond to one of the sets of radar parameters Radar(a), according to the index. According to this particular example, once $a_{THR}$ is determined (in block 740) to equal '6,' then process 700 proceeds to block 745.

In block 745, for each set of radar parameters Radar(a) and each corresponding set of GNSS parameters GNSS(a), computer 20 determines a target position T(a) of the calibration target 18 in a global frame of reference. According to an example, T(a) is determined using a pair of homogenous transformation matrices—e.g., a GNSS sensor to global homogenous transformation matrix ($T_{GNSS \rightarrow World}(a)$) and a radar sensor to GNSS sensor homogeneous transformation matrix ($T_{radar \rightarrow GNSS}(a)$). Equation (2) below is an example formula for calculating T(a) for 2D radar; however, this equation may be correspondingly modified for 3D radar implementations.

$$T(a) = T_{GNSS \rightarrow World} * T_{radar \rightarrow GNSS} * \text{Radar}(a) = [m(a)n(a)o(a)] \quad \text{Equation (2)}$$

According to an example, $T_{GNSS \rightarrow World}(a)$ may be a 3×3 matrix, $T_{radar \rightarrow GNSS}(a)$ may be a 3×3 matrix, and Radar(a) may be a 3×1 matrix (as shown in Equation (1)). Accordingly, in such implementations, T(a) will be a 3×1 matrix (as shown above). Further, according to at least one example, $T_{radar \rightarrow GNSS}(a)$ is a rotation matrix such as that shown in Equation (3), wherein rotation matrices are used to perform a rotation in Euclidean space.

$$T_{radar \rightarrow GNSS}(a) = \begin{pmatrix} \cos(\psi) & -\sin(\psi) & x \\ \sin(\psi) & \cos(\psi) & y \\ 0 & 0 & 1 \end{pmatrix} \quad \text{Equation (3)}$$

Continuing with the illustrated example, for block 745, determining T(a) for each of the positions P(a) will yield:

T(1)=[m(1) n(1) o(1)],
T(2)=[m(2) n(2) o(2)],
T(3)=[m(3) n(3) o(3)],
T(4)=[m(4) n(4) o(4)],
T(5)=[m(5) n(5) o(5)], and
T(6)=[m(6) n(6) o(6)].

Block 750 follows block 745. In block 750, computer 20 determines a plurality of differences, wherein the plurality of differences comprise the difference of any two values of T(a)—e.g., all potential differences. Operation (1) is an example of code which may be used to determine block 750.

```
Operation (1)
    % i and j are indices
    Let i = j = a_THR
    For each of T(i)
    {
        For each T(j)
        {
            If i ≠ j, then determine D(i, j), wherein D(i, j) is a
            Euclidean distance between T(i) and T(j)
        }
    }
```

Thus, Operation (1) will yield a plurality of Euclidean differences—e.g., D(1,2)=T(1)−T(2), D(1,3)=T(1)−T(3), . . . , D(2,3)=T(2)−T(3), D(2,4)=T(2)−T(4), . . . , etc. Continuing with the example above, each of these will be a 3×1 matrix.

In block 755, computer 20 determines a magnitude of each of the plurality of Euclidean differences (e.g., a magnitude of each of the 3×1 matrices). Equation (4) is illustrative; e.g., consider any of the 3×1 difference matrices to have the format: [q r s].

$$\text{Magnitude of } D(i, j) = Dij_{magnitude} = \sqrt{q^2 + r^2 + s^2} \quad \text{Equation (4)}$$

In block 760, computer 20 may determine a summation (Σ) of all magnitudes determined in block 755. Equation (5) is illustrative.

$$\Sigma = Dij_{magnitude} \text{ for}_{all} \text{ '}i,\text{' and for all '}j\text{'} \quad \text{Equation (5)}$$

In block 765, computer 20 may execute any suitable optimization algorithm to determine the calibration parameters—i.e., which values of x, y, and ψ minimize the value of the summation (Σ). According to one non-limiting example, computer 20 may execute a least square function in Matlab (e.g., such as the lsqnonlin function) in block 765. In some examples, using x or y and ψ, a range calibration parameter may be determined (e.g., range=x*$\cos^{-1}(\psi)$ or range=y*$\sin^{-1}(\psi)$).

In block 770, the range calibration parameter (range) and the azimuth calibration parameter (ψ) that result in the minimized summation (Σ) are stored and/or used by radar sensor 12 or computer 20 to improve the accuracy of the radar sensor 12.

Following block 770, process 700 may end. Alternatively, process 700 may proceed to block 775. Block 775 is optional. In block 775, the computer 20 may determine an upper bound and/or a lower bound for each of the calibration parameters. For example, using the Matlab function (lsqnonlin), computer 20 may return the largest and smallest values of each of x, y, and ψ —and as previously described, an upper and lower values of range may be determined therefrom. Accordingly, these may serve as upper and lower bounds in Matlab or the like for future calibrations.

Other implementations also exist. For example, computer 20 and at least one of first sensor 16 or radar sensor 12 may comprise a common assembly—e.g., a vehicle sensing module or the like.

Thus, there has been described a calibration system for a radar sensor. The system comprises a first sensor, a calibration target, and a computer. During calibration, multiple location datasets are determined using the first sensor (according to a first frame of reference). Further, the computer gathers corresponding datasets from the radar sensor as it ranges on the target (according to a second frame of reference). Using these datasets and conversions between the first and second frames of reference, calibration parameters for the radar sensor are determined using an optimization function. And these calibration parameters may be used to improve the accuracy of the radar sensor.

In general, the computing systems and/or devices described may employ any of a number of computer operating systems, including, but by no means limited to, versions and/or varieties of the AppLink/Smart Device Link middleware, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, Python, etc. Some of these applications may be compiled and executed on a computing machine, such as the so-called Java Virtual Machine, the so-called Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Where databases, data repositories or other data stores are described herein, these may include various kinds of mechanisms for storing, accessing, and retrieving various kinds of data, including a hierarchical database, a set of files in a file system, an application database in a proprietary format, a database management system (DBMS), etc. Each such data store is generally included within a computing device employing a computer operating system such as one of those mentioned above and are accessed via a network in any one or more of a variety of manners. A file system may be accessible from a computer operating system and may include files stored in various formats. A DBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., wearable devices, servers, personal computers, etc.), stored on computer readable media associated therewith (e.g., disks, memories, etc.). A computer program product may comprise such instructions stored on computer readable media for carrying out the functions described herein.

The processor is implemented via circuits, chips, or other electronic component and may include one or more microcontrollers, one or more field programmable gate arrays (FPGAs), one or more application specific circuits ASICs), one or more digital signal processors (DSPs), one or more customer integrated circuits, etc. The processor may be programmed to process the sensor data.

The memory (or data storage device) is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory may store data collected from sensors.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A method, comprising:
   (a) receiving, from a first sensor in a vehicle, a plurality of global navigation satellite system (GNSS) parameters, wherein the plurality of GNSS parameters define a unique terrestrial position of the first sensor;
   (b) receiving, from a radar sensor in the vehicle, a plurality of radar parameters, wherein the plurality of radar parameters define a position of a calibration target relative to the radar sensor;
   (c) repeating the receiving of (a) and (b) at additional unique terrestrial positions of the first sensor, wherein the steps of (a) receiving the plurality of global navigation satellite system (GNSS) parameters from the first sensor in the vehicle, (b) receiving the plurality of radar parameters, from the radar sensor in the vehicle, and (c) repeating the receiving of the plurality of global navigation satellite system (GNSS) parameters and the plurality of radar parameters at additional unique terrestrial positions of the first sensor, are repeated to receive a threshold quantity of unique terrestrial positions;
   (d) using the plurality of GNSS parameters received in (a) and (c) and the plurality of radar parameters received in (b) and (c), determining corresponding positions of the calibration target; and
   (e) using the corresponding positions of the calibration target, determining radar calibration parameters.

2. The method of claim 1, wherein (e) further comprises: determining the radar calibration parameters using a first transformation matrix relative to a frame of reference of the first sensor and using a second transformation matrix relative to a frame of reference of the radar sensor.

3. The method of claim 2, wherein at least one of the first or second transformation matrices is a rotation matrix.

4. The method of claim 3, wherein (e) further comprises: determining a plurality of Euclidean differences using the corresponding positions of the calibration target.

5. The method of claim 4, wherein (e) further comprises: determining a summation of the plurality of Euclidean differences; and determining the radar calibration parameters using an optimization function that determines a set of radar calibration parameters that minimize the summation.

6. The method of claim 5, wherein the set of radar calibration parameters comprise either: an x-parameter, a y-parameter, and a yaw-parameter.

7. The method of claim 5, further comprising: determining an upper bound or a lower bound of each of the radar calibration parameters.

8. The method of claim 1, further comprising: programming a computer or the radar sensor with the radar calibration parameters.

9. The method of claim 1, wherein the calibration target is fixed during (b) and (c).

10. The method of claim 1, wherein the first sensor is within a threshold distance of the calibration target during (b) and (c).

11. The method of claim 1, wherein the radar sensor is a two-dimensional (2D) radar sensor or a three-dimensional (3D) radar sensor, wherein the first sensor is one of a Global Positioning System (GPS) device or a Global Navigation Satellite System (GLONASS) device.

12. The method of claim 1, wherein the calibration target is a corner reflector.

13. A calibration system for a radar sensor in a vehicle, comprising:
    a first sensor in the vehicle;
    a calibration target; and
    a computer, comprising one or more processors and memory storing instructions executable by the one or more processors, the instructions comprising to:
    (a) receive, from a first sensor in the vehicle, a plurality of global navigation satellite system (GNSS) parameters, wherein the plurality of GNSS parameters define a unique terrestrial position of the first sensor;
    (b) receive, from the radar sensor in the vehicle, a plurality of radar parameters, wherein the plurality of radar parameters define a position of a calibration target relative to the radar sensor;
    (c) repeat the receiving of (a) and (b) at additional unique terrestrial positions of the first sensor, wherein the steps of (a) receiving the plurality of global navigation satellite system (GNSS) parameters from the first sensor in the vehicle, (b) receiving the plurality of radar parameters, from the radar sensor in the vehicle, and (c) repeating the receiving of the plurality of global navigation satellite system (GNSS) parameters and the plurality of radar parameters at additional unique terrestrial positions of the first sensor, are repeated to receive a threshold quantity of unique terrestrial positions;

(d) using the plurality of GNSS parameters received in (a) and (c) and the plurality of radar parameters received in (b) and (c), determine corresponding positions of the calibration target; and (e) using the corresponding positions of the calibration target, determine radar calibration parameters.

14. The system of claim 13, wherein (e) further comprises to:

determine the radar calibration parameters using a first transformation matrix relative to a frame of reference of the first sensor and using a second transformation matrix relative to a frame of reference of the radar sensor.

15. The system of claim 14, wherein (e) further comprises to: determine a plurality of Euclidean differences using the corresponding positions of the calibration target.

16. The system of claim 15, wherein (e) further comprises to: determine a summation of the plurality of Euclidean differences; and determine the radar calibration parameters using an optimization function that determines a set of radar calibration parameters that minimize the summation.

17. The system of claim 16, wherein the set of radar calibration parameters comprise either: an x-parameter, a y-parameter, and a yaw-parameter.

18. The system of claim 13, wherein the instructions further comprise to:

program a computer or the radar sensor with the radar calibration parameters.

19. The system of claim 13, wherein the calibration target is fixed during (b) and (c).

* * * * *